United States Patent [19]

Kaplan et al.

[11] 4,105,562
[45] Aug. 8, 1978

[54] FILTERING APPARATUS WITH MODULAR FILTER ELEMENTS

[75] Inventors: Stephen J. Kaplan, Woodland Hills; Rodolfo Gaba, Simi Valley, both of Calif.

[73] Assignee: Textron Inc., Providence, R.I.

[21] Appl. No.: 794,890

[22] Filed: May 9, 1977

Related U.S. Application Data

[63] Continuation of Ser. No. 683,880, May 6, 1976, abandoned.

[51] Int. Cl.² .................................... B01D 29/24
[52] U.S. Cl. ........................ 210/232; 55/341 R; 55/381; 210/323 T; 210/433 R; 210/447; 210/455
[58] Field of Search ............... 285/422, 187, 390; 210/232, 323 T, 282, 314, 316, 346, 323, 341, 345, 437, 238, 446, 347, 348, 335, 433 R, 447, 455; 55/381, 341

[56] References Cited

U.S. PATENT DOCUMENTS

| 2,440,487 | 4/1948 | Rayburn | 210/345 |
|---|---|---|---|
| 3,387,711 | 6/1968 | Rickert | 210/345 |
| 3,659,882 | 5/1972 | Souresny | 285/422 |

Primary Examiner—Frank Sever
Attorney, Agent, or Firm—Nilsson, Robbins, Dalgarn, Berliner, Carson & Wurst

[57] ABSTRACT

Filtering apparatus having a housing defining an inlet and an outlet. Disposed within the housing is a plurality of filter elements constructed in tubular form and held together as a bundle of such elements. The entire bundle of elements may be removed from or inserted into the housing as a unit. Each of the tubular filter elements has a threaded fitting at each end thereof with the threads on each of the ends being adapted for mating engagement with each other. In this manner a plurality of the filter elements may be assembled in tandem form by threaded engagement of the mating ends thereof to provide the desired filter area and size for any particular application without the necessity of custom designing filter elements for each housing or application. The mating threads are formed on dissimilar non-galling metals. A header assembly is utilized to threadably receive one end of a filter element while a base assembly is adapted to receive and retain the second ends of the filter assemblies thereby holding them in a proper position internally of the filter housing.

9 Claims, 5 Drawing Figures

FILTERING APPARATUS WITH MODULAR FILTER ELEMENTS

This is a continuation of application Ser. No. 683,880, filed May 6, 1976 now abandoned.

BACKGROUND OF THE INVENTION

In the filtering art, particularly where high temperature viscous material is being filtered, it has been customary to design a particular housing and filter element for each filter application. Typically, the filter elements have been relatively large in size to provide the desired filter area and flow rates needed. Such custom designs necessitate the user maintaining a large inventory of special parts. Typically, these filter elements are constructed of material which may be cleaned so that the filter element may be repeatedly used. Where a custon filter element of large size is used, such cleaning often requires the construction of special cleaning equipment. In addition, where a large single filter element is utilized, any damage to the filter media requires a replacement of the entire filter element at a large cost to the user. Obviously, the provision of special filter elements and cleaning equipment to fit special applications results in higher costs than would be encountered where a large number of standard type filter elements could be used for various applications.

In some large commercial operations, where fluids such as plastics are being filtered, it is extremely important that a filter element is removable rapidly from the flow of fluid being filtered to a cleaning station to preclude the fluid being filtered from solidifying and rendering the filter elements unusable for future applications. Thus, the filter elements must be easily removed and replaced within the housing.

The prior art patents known to applicants which relate to this area are U.S. Pat. Nos. 2,921,686; 2,946,446; 1,919,570; 2,572,971; 3,092,577; 3,268,442; 3,118,837; 2,859,876; 3,833,121; 3,028,627; 3,353,211; 3,488,806; 2,661,497; 2,763,308; 2,786,504; 3,007,199; 3,112,525; 3,145,746; 3,033,256; 3,059,276; 3,193,877; 3,243,849; 3,455,357; 3,480,706; 3,501,806; 3,503,096.

SUMMARY OF THE INVENTION

A filter assembly constructed of modular interchangeable filter elements which includes a housing, a header assembly and a base assembly for receiving and retaining said plurality of filter elements within said housing, each of the filter elements including a filter member, a first end fitting permanently affixed to one end of the filter member, a second end fitting permanently affixed to the other end of the filter member, with the two end fittings adapted for mating engagement with each other in metal-to-metal sealing relationship.

DETAILED DESCRIPTION

Figure 1:
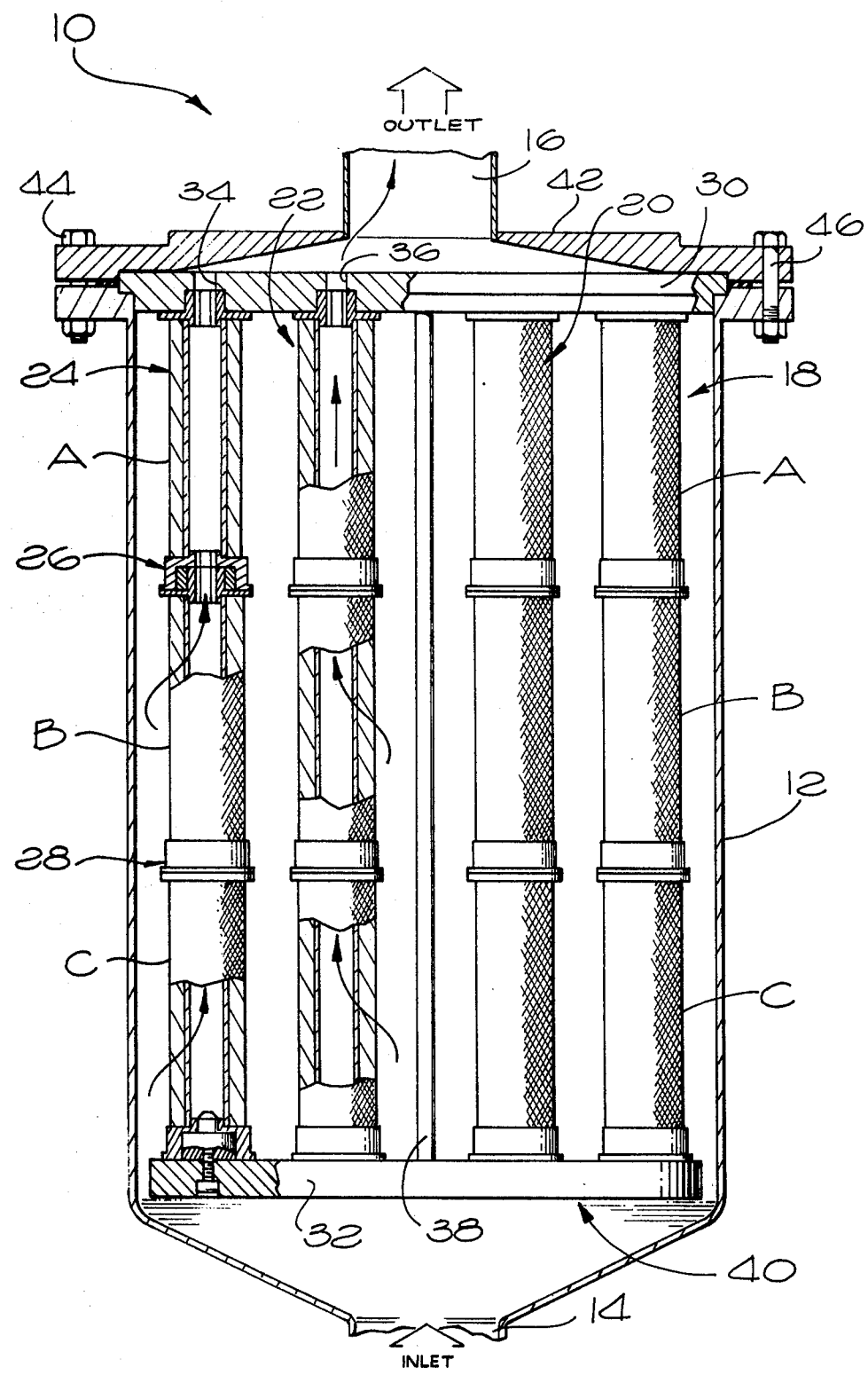
FIG. 1 is a schematic representation, partly in cross section, of a filter assembly constructed in accordance with the principles of the present invention.

Referring now to the drawings, and more particularly to FIG. 1, a filter apparatus constructed in accordance with the present invention is schematically illustrated. As is therein shown, a filter assembly 40 is positioned within a housing 12 having an inlet 14 and an outlet 16. Fluid to be filtered is supplied under pressure through the inlet 14 and into the interior of the housing 12 thus surrounding the filter means 18, 20, 22 and 24. The fluid under pressure passes through the filter means and in a filtered condition subsequently through the outlet 16 for use as may be directed by the particular application involved. The filter assembly is readily removed from the housing 12 and replaced by other filter assemblies constructed in like manner as will be more fully described hereinafter. It will be noted that each of the filter means 18 through 24 is constructed of a plurality of filter elements A, B, and C tandemly interconnected at a connecting joint as shown at 26 and 28. Through the utilization of such a structure the filter assembly after removal may be disassembled into its modular components and cleaned or individual modular components A, B and C replaced in the event of damage thereto as may be desired.

To retain the filter means 18 through 24 in position within the housing 12 there is provided a header 30 and a base 32. The header 30 has a plurality of openings, for example as shown at 34 and 36, provided therein and adapted to threadably receive the filter means 22 and 24 therein. The base 32 is provided with openings to receive retaining means as will be described more fully herein to secure the filter means 18 through 24 thereto. Depending upon the type of terminal fitting used on the filter means 18 through 24, a tie-rod 38 may be included to extend between the base 32 and the header 30 to secure the filter means 18 through 24 in place as required for a particular application. If, however, the terminal fittings are secured into the base 32 as more fully described below, the tie rod is eliminated, which is the preferred construction.

It will be recognized that with this construction the fluid under pressure which enters the inlet 14 of the housing 12 is blocked by the header 30 and thus can only pass through the filter means as is shown by the various arrows into the interior of each of the modular elements A, B and C thereof. By so passing through the filter means the fluid is filtered and then passes through the openings 34 and 36 and ultimately through the outlet opening 16 to the particular desired position. It will also be recognized by those skilled in the art that by the proper design of the filter means, the fluid to be filtered may be caused to flow in a direction opposite that designated in FIG. 1 so that the fluid enters through the central portion of the filter means and passes outwardly therethrough for the filtering operation.

The upper portion 42 of the housing 12 may be readily removed by removal of fastening means such as bolts or the like, 44 and 46, about the periphery thereof thereby enabling removal of the entire filter assembly 40 from the interior of the housing 12. When a new filter assembly is then inserted into the housing 12 the bolts may be replaced along with the upper portion 42 and after the same is secured in place the filter apparatus is again ready for use. Although only a single housing has been illustrated in FIG. 1, those skilled in the art will recognize that multiple housings may be employed with appropriate valves to divert the fluid flow from one filter to another without interrupting production thus permitting removal of filters for cleaning and repair.

Figure 2:
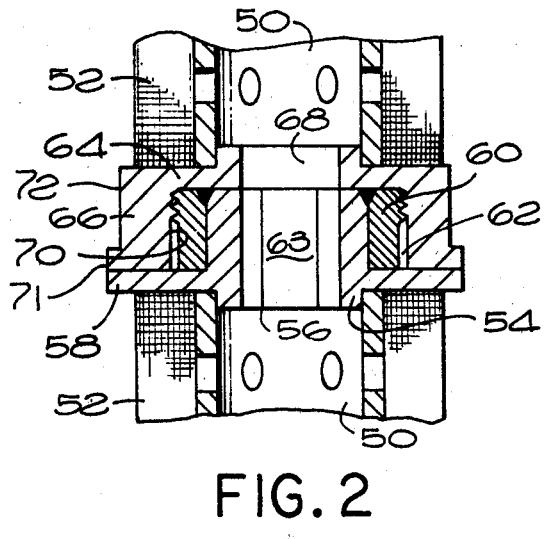
FIG. 2 is an enlarged fragmentary cross-sectional view illustrating the mating engagement between a pair of tandemly connected filter elements.

By reference now more particularly to FIG. 2, there is disclosed in detail the construction of the modular filter elements A, B and C which make up the filter means 18 through 24. As is shown in FIG. 2 each of the modular elements includes a central perforate tubular member 50 having a filter media 52 preferably constructed of wire cloth and metallic fiber depth type filter media which is pleated as known in the art and positioned about the outer periphery of the tube 50 to form a filter member. As above pointed out, depending on the desired flow path, the tube and filter media may be reversed. A first end fitting 54 constructed of a tubular body 56 having a radially outwardly extending flange 58 intermediate the ends thereof and defining a first metal surface is permanently affixed to one end of the tubular member 50. A sleeve 60 having threads 62 formed thereon is welded to the outer periphery of the tubular body 56 which extends away from the terminal portion of the tube 50. The sleeve 60 is welded in place upon the body 56 of the first end fitting 54. The sleeve 60 is formed of a material which will prevent galling when threadably engaged with the other end fitting as will be described herein below. Preferably the sleeve 60 is formed of one of 17-4 PH CRES stainless steel, type 430 stainless steel, or Ebrite 26-1 stainless steel while the remainder of the fittings are constructed of stainless steel type 316 1. Ebrite is a registered trademark of Colt Industries, East Troy, Mich. Through the utilization of these dissimilar stainless steels the sleeve 60 is constructed of metal having a smaller temperature expansion coefficient than the remainder of the fittings thus preventing galling subsequent to a heating and cooling cycle resulting from use. Therefore, the filter elements may be readily disassembled without damage.

It should be noted that the inner surface 63 of the body 56 is hexagonal in configuration thereby to receive a hand tool for threadably tightening or loosening the modular filter element with its particular threaded engagement as may be required.

A second end fitting 64 includes a cup shaped member 66 defining a central opening 68 therethrough and having a second metal surface. The inner surface 70 of the cup shaped member 66 has a plurality of threads formed thereon which threadably mate with the threads formed upon the sleeve 60. The second end fitting is permanently affixed to the end of the tube 50 of the modular filter element A, B and C. It will thus be recognized that the first end fitting 54 is disposed at one end of the modular filter element while the second end fitting 64 is at the opposite end thereof. Each of the end fittings is permanently affixed to the modular filter element. Thus, the first end fitting on one modular filter element may be threadably engaged into a second end fitting on another modular filter element line thereby to bring the first and second metal surfaces into metal-to-metal sealing engagement. In this fashion, any number of modular filter elements such as shown at A, B and C in FIG. 1 may be tandemly connected together to provide the filter area and filter length as required in any particular application and to fit within any particular filter housing which may exist. Depending upon the manner in which the filter elements are threadably engaged or alternatively are threadably fitted upon other structure the outer surface 72 of the cup shaped member 66 may be formed to have wrench flats provided thereon to also receive hand tools for threadably tightening or loosening the filter element into the desired position. It will be noted that the flange 58 abuts the end 71 of the fitting 64 to provide a metal-to-metal seal between the filter elements.

Figure 3:
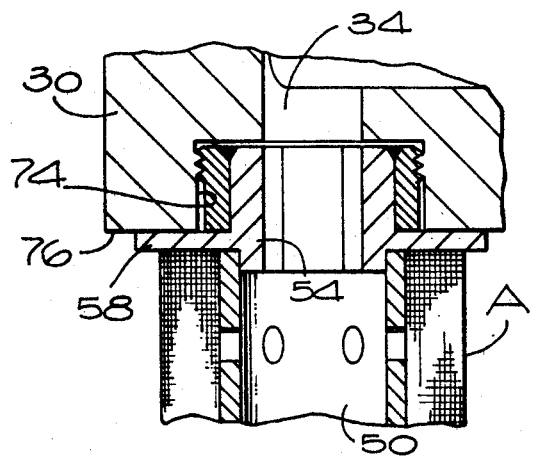
FIG. 3 is a fragmentary cross-sectional view showing one end of a filter element threadably engaging the header assembly.

By referring now more particularly to FIG. 3 the detailed configuration of the manner in which the filter element A is secured to the header 30 is illustrated. As it is therein shown the header 30 defines the opening 34 therein. The opening 34 has an enlarged diameter as is shown at 74 and upon which is formed threads. The threads formed upon the enlarged diameter 74 mate with the threads formed upon the first end fitting 54 on the modular filter element A. As is noted, the modular filter element A is secured by threads in place within the opening 34 in such a way that the opening 34 axially aligns with the opening through the tube 50 and the fitting 54. The flange 58 abuts the surface 76 of the header 30 and functions as a stop for the filter element A as well as providing a metal-to-metal seal with the surface 76 of the header.

Figure 4:
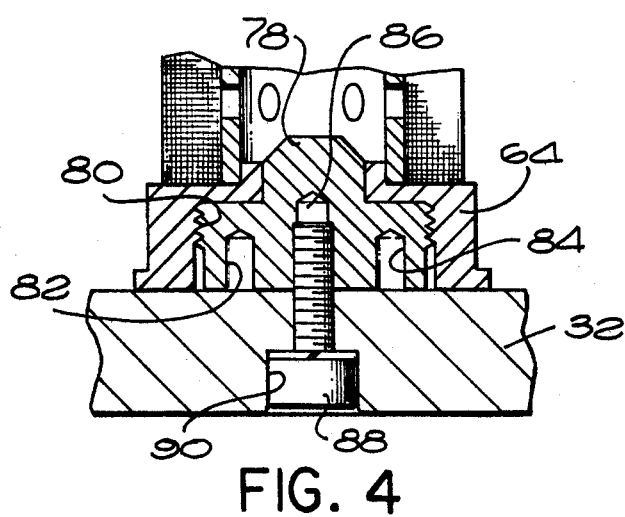
FIG. 4 is a fragmentary cross-sectional view illustrating the opposite end of a filter element connected to a base assembly.

By referring now more particularly to FIG. 4, the preferable means by which the filter means is secured to the base 32 is illustrated in greater detail. As is therein shown, a plug 78 has threads formed on an outer diameter 80 thereof which matingly receives the threads formed on the inner surface of the second end fitting 64. The plug 78 is thus screwed into position and includes a pair of openings 82 and 84 adapted to receive a spanner wrench so that the plug 78 may be secured into position in seating relationship with the second end fitting 64. As will also be noted the plug 78 defines a central bore 86 which has a plurality of threads formed therein. A stud 88 passes through an aperture 90 formed in the base 32 and threadably is received within the central bore 86. By tightening the stud 88 the second end fitting is secured firmly against the base 32. Again it will be noted that a metal-to-metal seal is formed between the fitting 64 and the plug 78 or alternatively the fitting 64 and the base 32.

From a consideration of the structures shown in FIGS. 2, 3 and 4 and as above described, those skilled in the art will appreciate that any number of filter elements may be assembled in tandem relationship as is desired. The thus assembled filter elements may then be threadably inserted into the header 30 and secured in place as required by an appropriate hand tool. The base would then be secured subsequent to placing of the plugs into the second end fitting of the last filter element displaced from the header 30. The entire assembly thus constructed could then be placed into the interior portion of a housing as above described to replace a filter assembly removed therefrom for cleaning.

Obviously, the reverse procedure can be employed to disassemble a filter assembly into its component parts of modular filter elements with the header and base assemblies. Each of the individual modular filter elements may then be cleaned in a manner well known to the art whereupon they may then be reused. It will be appreciated by those skilled in the art that through the utilization of such a modular element with the mating end fittings permanently secured thereto one may construct a plurality of filter assemblies having various filter areas and sizes both as to diameter and length, without the necessity of maintaining in inventory a large number of highly customized filter elements to fit each housing and each particular application. Obviously, this will reduce the cost of investment and maintenance to the user as well as permitting the manufacturer to concentrate on standard modular units for use by the user thereby decreasing the manufacturing costs of each of the individual units and lowering the overall price thereof to the user.

Figure 5:
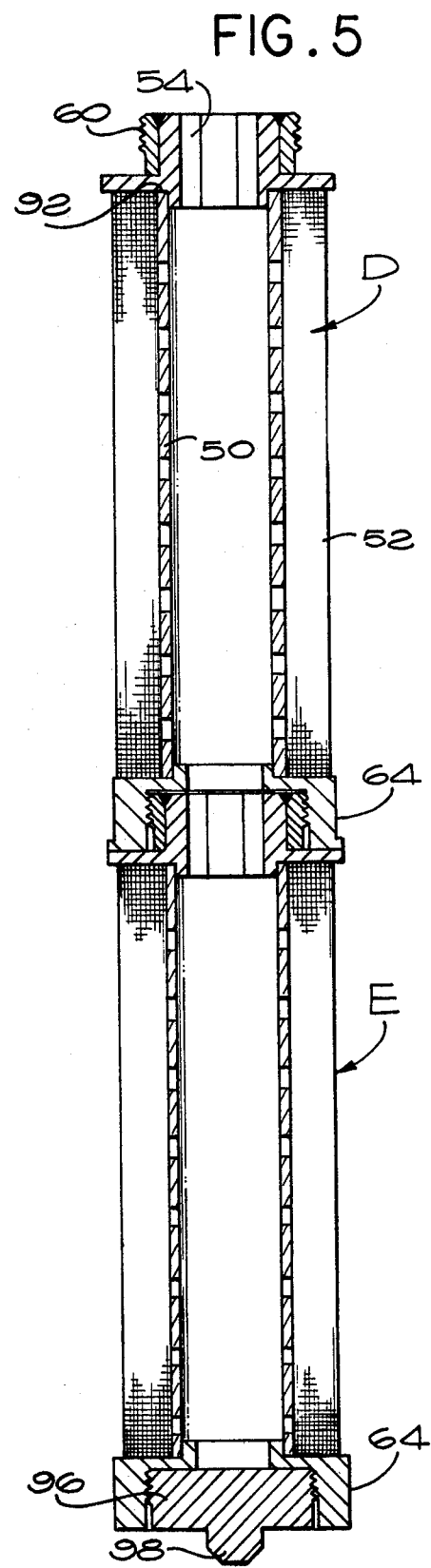
FIG. 5 is a cross-sectional view of a pair of filter elements connected together in tandem relationship in accordance with the principles of the present invention.

By referring now to FIG. 5 there is disclosed in greater detail a pair of completed modular filter elements constructed in accordance with the present invention and interconnected at a connecting joint with a solid plug at one end thereof. The same reference numerals will be utilized in describing these filter elements as were used above in conjunction with FIGS. 2, 3 and 4. Thus, it will be seen that there is provided a perforate tube 50 having a filter media 52 about the outer surface thereof. A first end fitting 54 is secured to one end 92 of the tube 50 while a second end fitting 64 is secured at the opposite end 94 of the tube 50. Two end fittings 54 and 64 are permanently secured to the ends 92 and 94 respectively of the tube 50. A dissimilar metal sleeve 60 is secured about the outer surface of the first end fitting 54 so as to be utilized in threadable engagement with the second end fittings on other filter elements without galling. A solid plug 96 is threadably engaged into the second end fitting 64 on the element E to thus provide a protrusion 98 which may be utilized to fit into an opening in a base member to thereby position the filter media for use in a filter assembly as above described. The protrusion 98 may have wrench flats formed thereon to permit tightening of the plug 96 once it is inserted into place to effect the desired metal-to-metal seal. A plurality of filter elements having the plug 96 therein would be held in place between a header and base with tie rods as above discussed.

A filter apparatus as herein disclosed utilizing the modular filter elements as described in detail may be utilized with fluid having a viscosity of 1000 to 3000 Poise and at temperatures to 700° F. with pressures up to approximately 2000 P.S.I.D. The filter assemblies are readily removed, disassembled, cleaned, reassembled and reinserted into housings with any individual modular filter elements that may have been damaged easily replaceable without having to replace the entire assembly.

What is claimed is:

1. Filter apparatus constructed of metallic tubular modular interchangeable filter elements for filtering fluids having a high viscosity, a high temperature and a high pressure comprising:
A. a plurality of filter means including a plurality of tandemly threadably interconnected metallic tubular modular filter elements, each of said metallic tubular modular filter elements including:
  1. a metallic filter member including a perforate tubular member and a filter media of metallic fiber;
  2. a first metal end fitting having a first metal surface and being permanently affixed to one end of said tubular member, and having male threads formed of a first type of stainless steel;
  3. a second metal end fitting having a second metal surface and being permanently affixed to the other end of said tubular member, and having female threads formed of a second type of stainless steel;
  4. said first and second end fittings adapted for threadably mating with each other with said first and second metal surfaces on adjacent elements in metal-to-metal sealing engagement when said modular filter elements are tandemly interconnected to form a filter means, said metal-to-metal seal being the only seal between adjacent modular filter elements; and
  5. said threaded portions of said first and second fittings being constructed of dissimilar stainless steel non-galling metals;
B. a metal header assembly defining a plurality of threaded recesses adapted for threadably receiving said first end fitting on one of said modular elements;
C. a metal base assembly including plug means adapted for receiving and retaining said second end fitting on another of said modular elements; and
D. a metal housing surrounding said header and base assemblies with said plurality of filter means supported therebetween.

2. Filter apparatus as defined in claim 1 wherein said base assembly includes plug means threadably received within said second end fitting and defining a threaded opening therein, a base plate defining a plurality of apertures, and a threaded stud extending through said aperture and into said opening in said plug to secure said element to said plate and to form a metal-to-metal seal.

3. Filter apparatus as defined in claim 1 wherein each of said first and second end fittings are adapted to receive hand tools for tightening said elements.

4. A metallic tubular filter element for use as an interchangeable module in constructing a filter assembly for filtering fluids having a high viscosity, a high temperature and a high pressure comprising:
A. a metal filter member including a perforate metal tubular member and a filter media of metallic fiber;
B. a metal first end fitting permanently secured to one end of said tubular member and having threads formed of a first type of stainless steel and a first metal surface;
C. a metal second end fitting permanently secured to the other end of said tubular member and having threads formed of a second type of stainless steel and a second metal surface;
D. said threads, on said first and second end fittings being constructed of dissimilar stainless steel non-galling metals and adapted for mating engagement, whereby a plurality of said elements may be threadably secured together in tandem arrangement thereby to form a filter means; and
E. said first and second metal surfaces of adjacent filter elements adapted for mating with each other in metal-to-metal sealing engagement when in said tandem arrangement said metal-to-metal sealing engagement being the only seal between adjacent filter elements.

5. A filter element as defined in claim 4 wherein each of said end fittings are adapted to receive a hand tool for use in fitting said elements into an assembly.

6. A filter element as defined in claim 4 wherein said perforate metal tubular member is a support tube and said metallic filter material is secured thereto, and said end fitting is permanently secured to said support tube.

7. A filter element as defined in claim 4 wherein said first end fitting includes a hollow cylindrical member having a flange extending outwardly therefrom intermediate the ends thereof and a sleeve permanently secured externally on one end of said cylinder adjacent said flange, said sleeve having external threads formed thereon.

8. A filter element as defined in claim 7 wherein said second end fitting includes a cup shaped member defining a central opening therethrough and having internal threads formed thereon displaced from said opening, said sleeve and said cup being constructed of said dissimilar stainless steel non-galling metal.

9. A first element as defined in claim 8 wherein said first and second metal surfaces are formed by said flange and an end of said cup shaped member on adjacent ones of a plurality of said elements threadably secured together in tandem arrangement to abut to form said metal-to-metal seal.

* * * * *